United States Patent [19]

Gaylord

[11] 4,168,359
[45] Sep. 18, 1979

[54] COPOLYMERS OF DIMERS OF CYCLIC CONJUGATED DIENES AND MALEIC ANHYDRIDE

[75] Inventor: Norman G. Gaylord, New Providence, N.J.

[73] Assignee: Borg-Warner Corporation, Chicago, Ill.

[21] Appl. No.: 789,400

[22] Filed: Apr. 21, 1977

Related U.S. Application Data

[63] Continuation-in-part of Ser. No. 641,211, Dec. 16, 1975, abandoned, which is a continuation-in-part of Ser. No. 470,705, May 16, 1974, abandoned.

[51] Int. Cl.$^2$ .................... C08F 232/08; C08F 232/06
[52] U.S. Cl. .................................. 526/208; 526/209; 526/213; 526/272
[58] Field of Search ......................... 526/272

[56] References Cited

U.S. PATENT DOCUMENTS

| 3,442,872 | 5/1969 | Korbanka | 526/272 |
| 3,449,236 | 6/1969 | Engelhart | 526/272 |
| 3,890,285 | 6/1975 | Sumita | 526/272 |
| 3,957,736 | 5/1976 | Tsuchiya | 526/272 |

*Primary Examiner*—Paul R. Michl
*Attorney, Agent, or Firm*—Richard J. Schlott

[57] ABSTRACT

Novel copolymers of maleic anhydride and dimers of cyclic conjugated dienes such as cyclopentadiene in which the maleic anhydride/dimer mole ratio ranges from 1/1 to 2/1. The copolymers are prepared by heating the dimer and maleic anhydride at a temperature of 50°–170° C., in the presence of a polar solvent and a free radical precursor which has a half-life of no more than 2 hours at the reaction temperature.

5 Claims, No Drawings

COPOLYMERS OF DIMERS OF CYCLIC CONJUGATED DIENES AND MALEIC ANHYDRIDE

This application is a Continuation-in-Part of U.S. application, Ser. No. 641,211, filed Dec. 16, 1975, now abandoned, which was a Continuation-in-Part of U.S. application, Ser. No. 470,705, filed May 16, 1974, now abandoned.

This invention relates to novel copolymers of maleic anhydride and the cyclic adducts of certain conjugated dienes, and more particularly to novel copolymers of maleic anhydride and the cyclic adducts of cyclic conjugated dienes. The invention also pertains to a process for preparing such polymers.

Cyclic conjugated dienes such as cyclopentadiene and the isomeric methylcyclopentadienes undergo uncatalyzed dimerization to yield bicyclic adducts containing unconjugated diolefinic unsaturation. The dimer dicyclopentadiene and the dimers of the isomeric methylcyclopentadienes may be distilled under reduced pressure without decomposition. However, attempted distillation at atmospheric pressure results in a retrograde dissociation of the dimers and the distillation and recovery of the cyclic conjugated dienes. Thus, cyclopentadiene is obtained by the thermal cracking of dicyclopentadiene at its boiling point of 170° C. or higher. The stability of cyclopentadiene is limited to ambient temperature and spontaneous dimerization occurs to regenerate dicyclopentadiene. At higher temperatures, higher oligomers, up to pentamers, are formed. The polymerization is believed to involve the partial dissociation of the dimer to a monomer which then reacts with dimer in a Diels-Alder reaction to form trimer, the reaction of monomer with trimer to form tetramer, etc.

When the thermal polymerization of dicyclopentadiene is carried out at elevated temperatures in the presence of maleic anhydride, the latter is incorporated into the polymeric product. Thus, U.S. Pat. No. 3,890,285 discloses the preparation of an alcohol-soluble resin having an acid number of at least 180 and a softening point of 100°–200° C., by heating the dimer and maleic anhydride at 170°–330° C. U.S. Pat. no. 3,449,236 describes the preparation of a hydrocarbon oil-soluble copolymer of maleic anhydride and a non-conjugated cyclic diolefin by heating the anhydride and the diolefin with or without a solvent at temperatures above 250° F. Typical solvents include aliphatic and aromatic hydrocarbons. The oil-soluble copolymer may also be prepared using a radical catalyst at a lower temperature, in the absence or presence of the hydrocarbon solvents.

One object of the present invention is to provide novel copolymers of maleic anhydride and the dimers of cyclic conjugated dienes.

Another object of the present invention is to provide a process for preparing such novel copolymers.

These and other objects of the present invention will become apparent from the ensuing description and illustrative embodiments.

In accordance with the present invention, it has now been found that copolymers having softening points above 200° C. can be obtained by reacting maleic anhydride and the dimers of cyclic conjugated dienes in the presence of free radical precursors. The copolymers are insoluble in hydrocarbon solvents and contain maleic anhydride and the dimer of the cyclic conjugated diene in a mole ratio of 1/1–2/1.

The dimers of the cyclic conjugated dienes which are useful for preparing the novel copolymers of this invention comprise the dimers of cyclopentadiene and the isomeric methylcyclopentadienes.

The required free radical precursor may be conventional polymerization catalysts, including azo compounds, dialkyl peroxides, diacyl peroxides, peresters, hydroperoxides, etc., e.g. azobisisobutyronitrile, benzoyl peroxide, tert-butyl peroxypivalate, tert-butyl peracetate, tert-butyl perbenzoate, tert-butyl hydroperoxide, di-tert-butyl peroxide, etc. The free radical catalyst is used at concentrations of 0.5–10 mole-% based on monomers, and preferably at temperatures where the half-life is no more than 2 hours.

The reaction is carried out in the presence of an organic solvent which is inert towards anhydride functionality, i.e., a solvent which does not contain reactive hydrogen atoms such as alcohols, mercaptans or amines. High yields of copolymers which are soluble in polar solvents such as acetone, dioxane and ethyl acetate and insoluble in hydrocarbon solvents such as hexane, heptane, benzene and toluene are obtained by carrying out the copolymerization reaction in polar solvents such as ketones, esters and ethers. When the reaction is carried out in bulk or in hydrocarbon solvents, the product is predominantly acetone-insoluble, generally crosslinked, copolymer.

The reaction temperature may range from about 0° to 170° C., and preferably from about 50° to 170° C. Either atmospheric or superatmospheric pressure may be employed.

In accordance with one method of carrying out the present invention, the catalyst is added continuously or intermittently over a period of time, to a solution of the comonomers which is being maintained at the desired reaction temperature. Alternatively, a solution of the catalyst in the dimer of the cyclic conjugated diene is added to a solution of maleic anhydride at the desired reaction temperature.

The reaction occurs rapidly during the period of catalyst addition and is virtually complete shortly thereafter. Although the reaction may be terminated by cooling at that time, the reaction mixture is generally heated for an additional period to ensure maximum conversion.

When the reaction is carried out in a solvent for the polymer, e.g. acetone, cyclohexanone or other ketones, esters or dioxane, the insoluble copolymer, if any, may be separated by filtration and the soluble copolymer isolated from the filtrate by precipitation with a non-solvent such as hexane. When the solvent concentration is greater than 25% by weight of the total reaction mixture the copolymer is generally completely soluble in acetone or other polar solvents. It will be understood that the exact method of recovering the copolymers from the reaction mixture is not a critical feature of this invention, and that any of the known procedures may be readily employed.

The products of the process of the present invention are copolymers of maleic anhydride and the dimer of the cyclic conjugated diene, where the maleic anhydride/dimer mole ratio in the copolymer ranges from 1/1 to 2/1. When the maleic anhydride/dimer ratio is 1/1–1.9/1, the copolymer is unsaturated, soluble in polar solvents and insoluble in hydrocarbons. The 2/1 maleic anhydride-dimer copolymer is saturated, soluble in polar solvents and insoluble in hydrocarbon solvents.

Although the actual structure of the copolymer is not known and the applicant does not wish to be bound to any theoretical interpretation, it is believed that the unsaturated 1/1 maleic anhydride-dimer copolymer and the saturated 2/1 maleic anhydride-dimer copolymer have the following structural units, respectively.

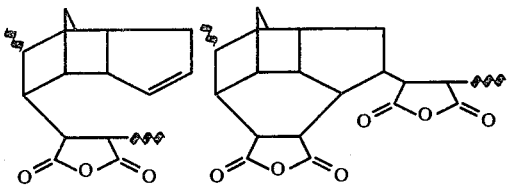

When the maleic anhydride/dimer ratio in the copolymer is between 1/1 and 2/1 both structural units are present.

In carrying out the process of the present invention, the molar ratio of maleic anhydride to the dimer of the cyclic conjugated diene may range from 5:1 to 1:5. However, since the copolymer contains maleic anhydride and the dimer in 1/1 to 2/1 ratio, the preferred comonomer change is within the range 3/1-1/3.

Infrared spectra of the unsaturated copolymers confirm the presence of absorption peaks characteristic of copolymers containing maleic anhydride and unsaturated polymers containing cyclopentene units.

The NMR spectra of the soluble unsaturated copolymers show absorption peaks in the 5.3–9.1τ region, as well as in the 3.5–4.5τ region, the latter indicative of the presence of unsaturation.

The invention will be more fully understood by reference to the following illustrative embodiments.

EXAMPLE I

A solution of 9.0 ml. (30 mmoles) of t-butyl peroxypivalate in 66.0 g. (500 mmoles) of freshly distilled dicyclopentadiene was added in four portions over a period of 10 minutes to a solution of 9.8 g. (100 mmoles) of maleic anhydride in 24.2 ml of cyclohexanone in a 250 ml. flask, equipped with a stirrer, condenser, thermometer and dropping funnel, immersed in an 80° C. constant temperature bath. After the catalyst addition was completed, the reaction mixture was maintained at 80° C. for an additional 20 minutes. After cooling to room temperature, the highly viscous yellow polymer was competely dissolved in acetone and precipitated by the addition of hexane. The yield of acetone-soluble, hexane-insoluble copolymer was 23.1 g. (30.3% conversion based on total monomers, 100% yield based on a 1/1 maleic anhydride-dicyclopentadiene copolymer). The copolymer had a cryoscopic molecular weight of 812, measured in dioxane.

Analyses. Calculated for 1/1 maleic anhydride-dicyclopentadiene copolymer $C_{14}H_{14}O_3$: C, 73.1; H, 6.1. Found: C, 73.2; H, 6.6.

The NMR spectrum of the copolymer at ambient temperature measured in acetone -$d_6$ using tetramethylsilane as internal standard, showed absorption in the 3.5–4.5τ region, indicative of the presence of unsaturation.

EXAMPLE II

The procedure described in Example I was repeated by adding a solution of 3.5 ml. (15 mmoles) of t-butyl peracetate in 26.4 g. (200 mmoles) of dicyclopentadiene to a solution of 9.8 g. (100 mmoles) of maleic anhydride in 12.2 ml. cyclohexanone at 155° C. The yield of acetone-soluble, hexane-insoluble copolymer was 16.4 g. (45.3% conversion based on total monomers, 100% yield based on a 2/1 maleic anhydride dicyclopentadiene copolymer). The copolymer had a softening point of 263° C. and a molecular weight of 886 by cryoscopy in nitrobenzene.

Analyses: Calculated for 2/1 maleic anhydride-dicyclopentadiene copolymer. $C_{18}H_{16}O_6$: C, 65.8; H, 4.9. Found: C, 66.4; H, 5.6.

The NMR spectrum and attempted titration with iodine monochloride confirmed the absence of unsaturation in the copolymer.

EXAMPLE III

The procedure described in Example I was repeated by adding a solution of 2.9 ml (10 mmoles) of t-butyl peroxypivalate in 13.2 g. (100 mmoles) of dicyclopentadiene to a solution of 9.8 g. (100 mmoles) of maleic anhydride in 24.2 ml. of cyclohexanone at 80° C. The acetone-soluble copolymer was isolated by precipitation with hexane. The yield of copolymer was 19.5 g. (84.8% conversion based on total monomers). The copolymer had a softening point of 260° C.

Analyses: Calculated for maleic anhydride-dicyclopentadiene copolymer. 1/1 copolymer $C_{14}H_{14}O_3$: C, 73.1; H, 6.1. 2/1 copolymer $C_{18}H_{16}O_6$: C, 65.8; H, 4.9. Found: C, 70.4; H, 6.6.

The NMR spectrum confirmed the presence of unsaturation.

EXAMPLE IV

The procedure described in Example I was repeated by adding a solution of 2.9 ml. (10 mmoles) of t-butyl peroxypivalate in 13.2 g. (100 mmoles) of dicyclopentadiene to a solution of 9.8 g. (100 mmoles) of maleic anhydride in 12.1 ml. of cyclohexanone at 80° C. The product was completely soluble in acetone and was isolated by precipitation with hexane. The copolymer was obtained in a yield of 18.4 g. (79.9% conversion based on total monomers and had a cryoscopic molecular weight of 189, measured in dioxane. The elemental analyses indicated that the copolymer contained both 1/1 and 2/1 maleic anhydride/dicyclopentadiene units.

Analyses. Found: C, 69.9; H, 6.3.

The NMR spectrum showed that the copolymer was unsaturated, as indicated by the presence of absorption in the 3.5–4.5τ region.

EXAMPLE V

The procedure described in Example I was repeated by adding a solution of 2.3 ml. (10 mmoles) of t-butyl peracetate in 13.2 g. (100 mmoles) of dicyclopentadiene to a solution of 9.8 g. (100 mmoles) of maleic anhydride in 7.3 ml. of cyclohexanone at 155° C. After cooling the reaction mixture to room temperature, acetone was added to the gelatinous mass to dissolve the soluble copolymer and, after standing overnight, the mixture was filtered. The acetone-soluble copolymer was isolated by the addition of hexane.

The acetone-soluble copolymer weighed 1.6 g. (7.0% conversion based on total monomers, 9.4% of total copolymer), was saturated (NMR spectrum) and had an elemental analysis indicating that it was a 2/1 maleic anhydride-dicyclopentadiene copolymer.

Analyses. Calculated for $C_{18}H_{16}O_6$: C, 65.8; H, 4.9. Found: C, 66.2; H, 5.6.

The acetone-insoluble crosslinked copolymer weighed 13.5 g. (58.7% conversion, 90.6% of total copolymer) and had the following elemental analyses:

Analyses. Found: C, 69.0; H, 6.2.

EXAMPLE VI

A solution of 2.9 ml. (10 mmoles) of t-butyl peroxypivalate in 13.2 g. (100 mmoles) of dicyclopentadiene was added in four portions over a period of 10 minutes to a solution of 9.8 g (100 mmoles) of maleic anhydride in 12 ml. of dioxane at 80° C. After an additional 20 minutes at 80° C., the reaction mixture was cooled and diluted with 100 ml. acetone. After standing overnight, the copolymer had completely dissolved in the acetone. The acetone-soluble copolymer was precipitated with hexane. The yield of copolymer was 17.8 g. (77.6% conversion). The elemental analyses indicated a composition containing both 1/1 and 2/1 maleic anhydride-dicyclopentadiene units.

The novel copolymers of this invention may be converted into numerous derivatives by any of the known reactions for organic compounds containing anhydride groups. Thus, for example, the copolymers containing anhydride groups may be hydrolyzed to produce recurring units which are dicarboxylic acids and which in turn may be converted to mono- or dicarboxylic acid salts. The carboxylic acid groups may be esterified with monohydric alcohols or diazoalkanes to yield monoester acids or diesters, respectively. The anhydride groups may be reacted with monohydric alcohols to produce monoester acids or diesters, depending upon the relative amount of alcohol and the reaction conditions. The anhydride groups may also be reacted with amines to yield monoamide acids or diamides or imides and with ammonium hydroxide to produce the mono- or diammonium salts as well as the monoamide-monoammonium salt. Since the copolymer contains numerous anhydride groups, by controlling the quantity of reagent it is possible to control the extent of reaction.

The novel copolymers of the present invention may be employed as stabilizers, dispersants, emulsifiers, textile and paper sizing agents, leveling agents in floor polishes, etc.

The polanhydrides or half acids may be utilized to cure epoxy, alkyd, amine-formaldehyde, thermosetting acrylic and other resins containing reactive functionality or may themselves be cured by agents containing such functionality.

While particular embodiments of this invention are shown above, it will be understood that the invention is obviously subject to variations and modifications without departing from its broader aspects.

What is claim is:

1. A hydrocarbon-insoluble copolymer consisting of maleic anhydride and a dimer of a cyclic conjugated diene, said cyclic diene selected from the group consisting of cyclopentadiene and methylcyclopentadiene, wherein the maleic anhydride/dimer mole ratio is 2/1 and the copolymer is saturated and wherein the softening point is above 200° C.

2. A process for the preparation of copolymers consisting of maleic anhydride and a dimer of a cyclic conjugated diene, said diene selected from the group consisting of cyclopentadiene and methylcyclopentadiene, which comprises heating maleic anhydride and said dimer in a mole ratio of from 5/1 to 1/5 in a polar solvent, at a temperature of 50° to 170° C., in the presence of a free radical precursor which has a half-life of no more than 2 hours at the reaction temperature, to obtain a copolymer having a softening point above 200° C.

3. The process of claim 2 wherein said free radical precursor is a peroxygen compound.

4. The process of claim 3 wherein the free radical precursor is added as a solution in said dimer to a solution of maleic anhydride at the reaction temperature.

5. The process of claim 2 wherein the polar solvent is selected from the group consisting of ketones, esters and ethers.

* * * * *